United States Patent [19]
Center

[11] Patent Number: 5,235,794
[45] Date of Patent: Aug. 17, 1993

[54] BAG MAKING APPARATUS AND METHOD

[75] Inventor: John L. Center, Dallas, Tex.

[73] Assignee: Recot, Inc., Plano, Tex.

[21] Appl. No.: 907,114

[22] Filed: Jul. 1, 1992

[51] Int. Cl.⁵ .................. B65B 1/22; B65B 9/08
[52] U.S. Cl. ..................... 53/437; 53/202;
53/451; 53/525; 53/546; 53/552; 53/554
[58] Field of Search ............ 53/202, 451, 546, 551,
53/552, 554, 525, 437; 141/72, 74, 77

[56] References Cited

U.S. PATENT DOCUMENTS

| | | |
|---|---|---|
| 1,937,501 | 6/1931 | Aldrich . |
| 1,944,147 | 1/1934 | Aldrich . |
| 2,600,222 | 6/1952 | Donofrio ............ 53/546 X |
| 2,837,882 | 6/1958 | Hull ...................... 53/525 |
| 3,054,236 | 9/1962 | Stroop . |
| 3,070,931 | 1/1963 | Zwight ................. 53/552 |
| 3,077,063 | 2/1963 | Stroop . |
| 3,237,369 | 3/1966 | Stroop ................ 53/202 |
| 3,611,671 | 10/1971 | Skinner et al. . |
| 3,641,737 | 2/1972 | Tamagni ............... 53/554 |
| 3,668,815 | 6/1972 | Henry et al. . |
| 3,681,890 | 8/1972 | Pringle, Jr. et al. . |
| 3,846,569 | 11/1974 | Kaplan . |
| 4,067,173 | 1/1978 | Borrello . |
| 4,262,473 | 4/1981 | Brooke . |
| 4,603,540 | 8/1986 | Kopp ..................... 53/546 |
| 4,768,330 | 9/1988 | Lane, Jr. et al. . |
| 4,769,974 | 9/1988 | Davis . |
| 4,845,926 | 7/1989 | Davis . |
| 5,146,730 | 9/1992 | Sadek et al. ............ 53/546 X |

FOREIGN PATENT DOCUMENTS 442110 12/1972 U.S.S.R. ................ 53/202

Primary Examiner—John Sipos
Assistant Examiner—Linda B. Johnson
Attorney, Agent, or Firm—Rothwell, Figg, Ernst & Kurz

[57] ABSTRACT

A multiple bag forming and filling apparatus and method utilizes a plurality of filling tubes which have a cross-sectional width in the range from one-third to one times the width of the tubular preform between the vertical seals at the filling tube means. There is also disclosed the directing of horizontally adjacent vertical tubular bag preforms to opposite sides of a center sealing bar prior to forming transverse seals by movable seal bars on the opposite sides. The horizontal displacement of the horizontally adjacent bags prevents the adjacent bags from being sealed together.

15 Claims, 4 Drawing Sheets

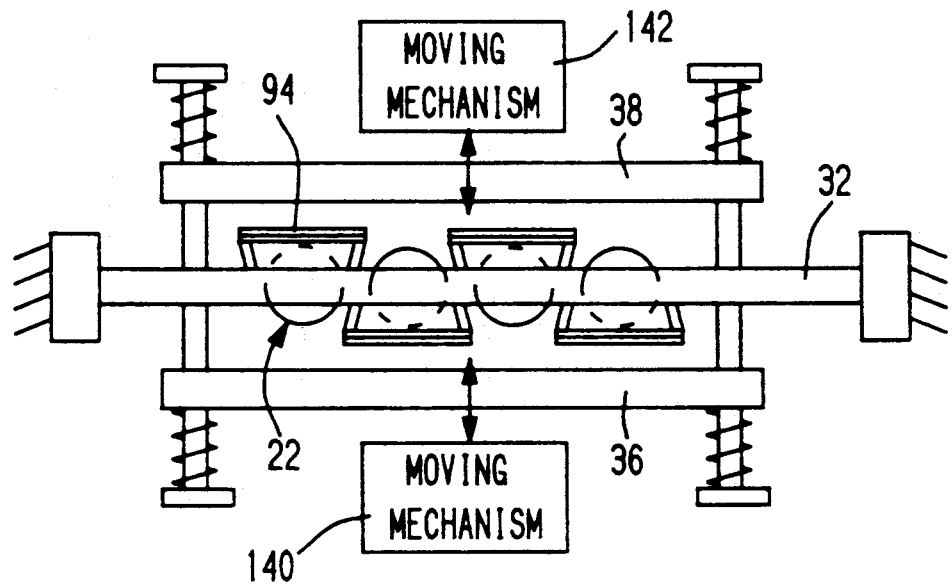
FIG. 3
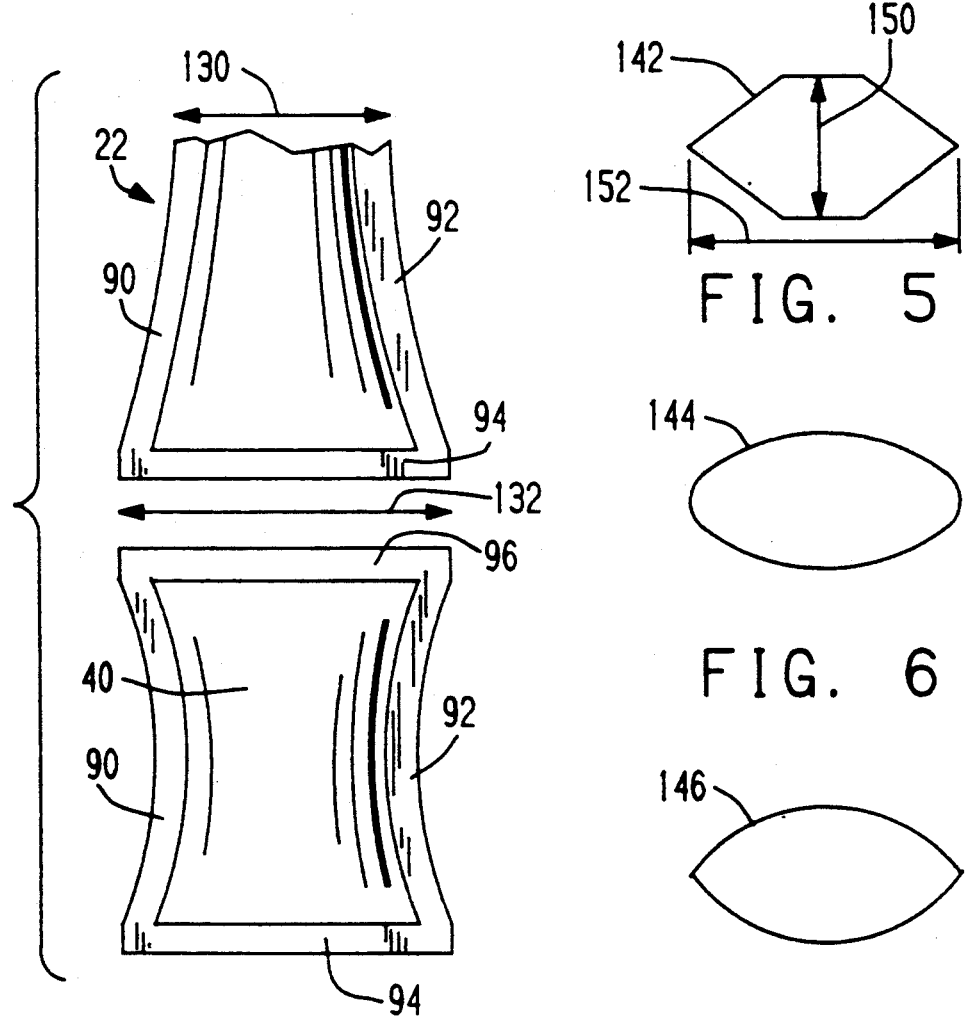
FIG. 4
FIG. 5
FIG. 6
FIG. 7

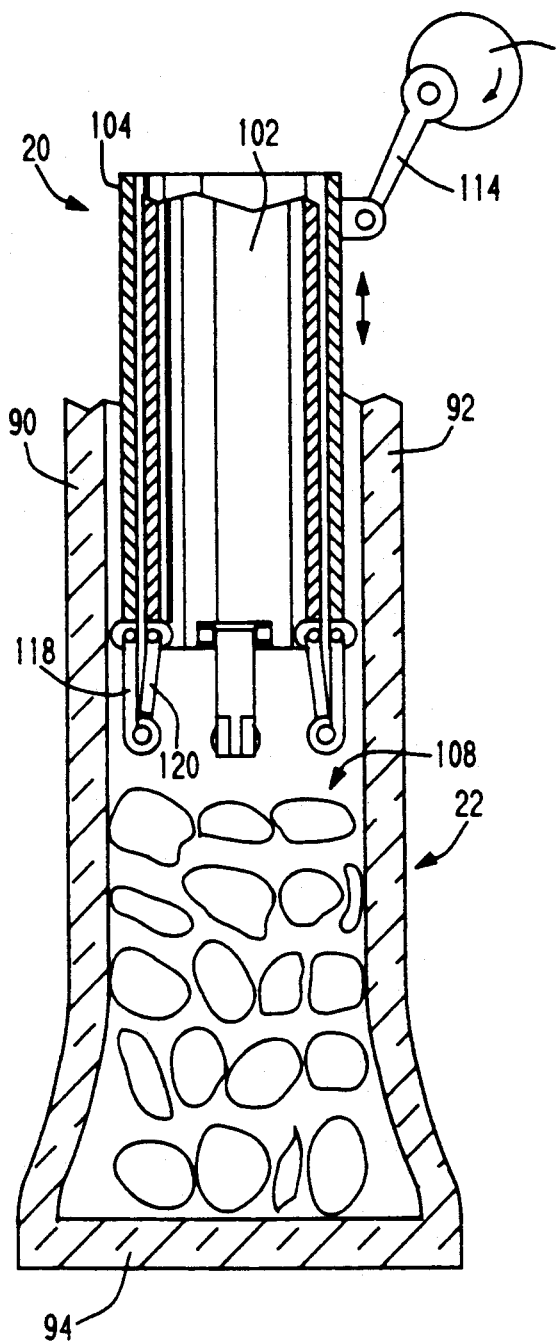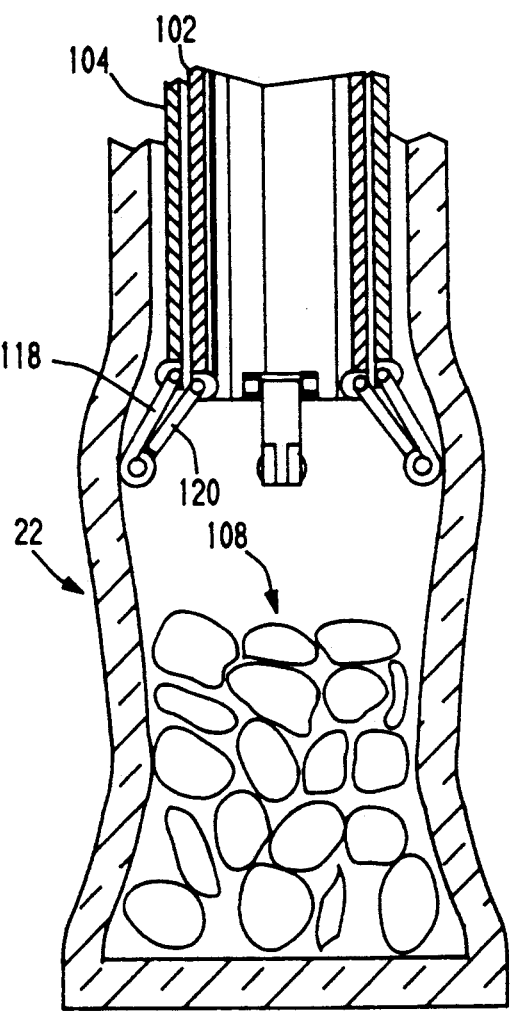
FIG. 11
FIG. 12

BAG MAKING APPARATUS AND METHOD

BACKGROUND OF THE INVENTION

1. Field of the Invention

The present invention relates to apparatus and methods of bagging fragile low density particulate materials such as food snacks like potato chips, corn chips, tortilla chips, and the like.

2. Description of the Prior Art

Food snacks are generally bagged utilizing a single continuous thermoplastic sheet, such as a cellophane sheet, which is formed into a tube about a vertical tubular mandrel or former with overlapping longitudinal edges heat sealed together. A pair of adjacent transverse seals are formed across the thermoplastic tube below the former, the lower transverse seal closing the top of a filled bag and the upper transverse seal closing the bottom of a bag to be filled. A weighed quantity of fragile low density particulate product is discharged through the former and falls into the bag to be filled. It is conventional to oscillate the bag wall by means of engagement of the outside of the bag wall with an oscillating piston of an air cylinder or with an oscillating transverse spring during the filling operation to settle the product in the bag to be filled. The sheet material and the thermoplastic tube are advanced and the transverse seals are repeated to close the top of the newly filled bag and the bottom of the next bag to be filled. Bags formed in this manner from single sheets are sometimes referred to as pillow bags or pouches.

U.S. Pat. No. 1,937,501 for machine for making and filling packages and U.S. Pat. No. 1,944,147 for bag making and filling machine disclose pillow bag making apparatus wherein a former or a tubular mandrel coaxially surrounding the feed tube is reciprocated vertically to advance the tubular bag between bag sealing and filling operations.

Generally the prior art apparatuses used in bagging fragile low density particulate product, such as food snacks like potato chips, corn chips, tortilla chips and the like, utilize a single former and have limited speed in bag forming capacity so that the employment of a large number of apparatuses are required for commercial scale production. The mechanism for forming the single sheet into a tube has a relatively large size which prevents the assembly of a plurality of bagging units in a single bagging machine of convenient size for installation in a product line. Furthermore these tube formers of such apparatuses have a small range of size tolerance for a given size of bag and are relatively expensive. While the formers can be changed to produce different bag sizes, such change is time-consuming leading to loss of production where the scale of production does not warrant the expense of separate bagging machines and floor space for each of several bag sizes. The longitudinal overlapping seal produced by heat and pressure between a tube former and a heat sealing die is generally weaker and more subject to failure than a seal formed between opposing dies due to the pressure and seal forming limitations of the tube former structure.

Each bag forming and filling apparatus requires sufficient floor space for the apparatus and associated raw product supply and finished product boxing equipment. Thus the quantity of finished product produced per square area of plant floor space is limited by the speed of the bag making and filling apparatus.

Fluid products such as condiments are packed by apparatuses which form and fill multiple columns of bags. The bags are formed by sealing two thermoplastic sheets or the halves of a folded single thermoplastic sheet together. U.S. Pat. No. 3,846,569 for a method of making a disposable precharged coffee bag, U.S. Pat. No. 4,067,173 for a packaging machine, U.S. Pat. No. 4,768,330 for a bag gripper and spreader for form, fill and seal bagging machine and U.S. Pat. No. 4,845,926 for pouch packaging machine with independent side and cross seals disclose apparatuses of this type for forming and filling bags of ground coffee beans, fine particulate material such as dry noodles, and condiments. Bags produced by this type of apparatus have seals formed on all four sides to form the bags from the thermoplastic sheet or sheets. The existing multiple column bag making and filling apparatus is considered suitable, and has been used, only for forming relatively flat bags which can readily accommodate liquid or very fine particulate product.

An object of the present invention is to construct bag forming and filling apparatus and methods which are more efficient and productive in bagging fragile low density particulate products.

Another object of the invention is to provide multi-column apparatus and methods of bag forming and filling which can bag fragile low density products such as potato chips, corn chips, tortilla chips, and the like.

SUMMARY OF THE INVENTION

The invention is summarized in an apparatus and method for forming and filling sealed thermoplastic bags with a fragile low density product wherein continuous thermoplastic sheet material is advanced and formed into a plurality of vertical tubular preforms having vertical seals on opposing sides of each preform. Transverse heat seals are formed across the tubular preforms at a sealing station to form a top seal on bags extending below the sealing station and to form a bottom seal on a bag to be filled extending in the tubular preform above the sealing station. Predetermined quantities of the fragile low density particulate product is discharged into filling tubes extending vertically into the tubular preforms above the sealing station to pass downward under the force of gravity into the bag to be filled. Each filling tube has a cross-sectional width perpendicular to the thermoplastic sheet material which is in the range from one-third to one times the length of a cross-section of the bag between the vertical seals at the filling tube.

In accordance with a second aspect of the invention, a method and apparatus for forming and filling sealed thermoplastic bags with a fragile low density product includes advancing a pair of continuous thermoplastic sheets or halves of a longitudinally folded thermoplastic sheet downward on opposite sides of a plurality of spaced parallel fill tubes having axes extending in a common vertical plane. The pair or halves of thermoplastic sheet(s) are sealed together on opposite sides of each fill tube with continuous vertical seals to form a plurality of vertical tubular preforms. Adjacent vertical tubular preforms are severed apart along a vertical line to separate the tubular preforms from each other. Alternate separated tubular preforms are displaced in opposite directions from the common vertical plane below the fill tubes. Transverse heat seals are formed across each displaced tubular preform at a sealing station to form on each tubular preform a top seal on a bag extending below the sealing station and a bottom seal on a bag to be filled extending in the tubular preform above the sealing station. Predetermined quantities of the fragile low density product are discharged into each of the filling tubes to pass downward under the force of gravity into the bags to be filled.

One advantage of the invention is that the severing and horizontal offsetting of adjacent columns of bags being formed and filled enables the forming of seals across the bags even when the bags are substantially circular in cross section due to the bulkiness of the product being bagged.

An additional feature of the invention is that vertical oscillating motion of a filling or forming tube is translated into transverse oscillation to oscillate the wall of a bag being filled to settle product in the bag being filled.

In a modified embodiment, the wall of the tubular preform above the sealing station is oscillated by a mechanism responsive to vertical oscillation of a filling or forming tube member to settle the fragile low density product in the bag being filled.

Other objects, advantages and features of the invention will be apparent from the following description of the preferred embodiments taken in conjunction with the accompanying drawings.

BRIEF DESCRIPTION OF THE DRAWINGS

FIG. 3 is a horizontal sectional view from the bottom of a sealing station in the machine of FIG. 1.

FIG. 4 is a front view of a completed bag and a partially completed bag in the machine of FIG. 1.

FIG. 5 is a diagrammatical cross-section view of a second variation of the forming tube of the multi-column bag forming and filling machine.

FIG. 6 is a diagrammatical cross-section view of a third variation of the forming tube of the multi-column bag forming and filling machine.

FIG. 7 is a diagrammatical cross-section view of a fourth variation of the forming tube of the multi-column bag forming and filling machine.

FIG. 11 is an elevational section view of a variation of the product settling portion of the machine of FIG. 1.

FIG. 12 is a view similar to FIG. 11 but illustrating a subsequent step in operation of the machine.

DESCRIPTION OF THE PREFERRED EMBODIMENTS

Figure 1:
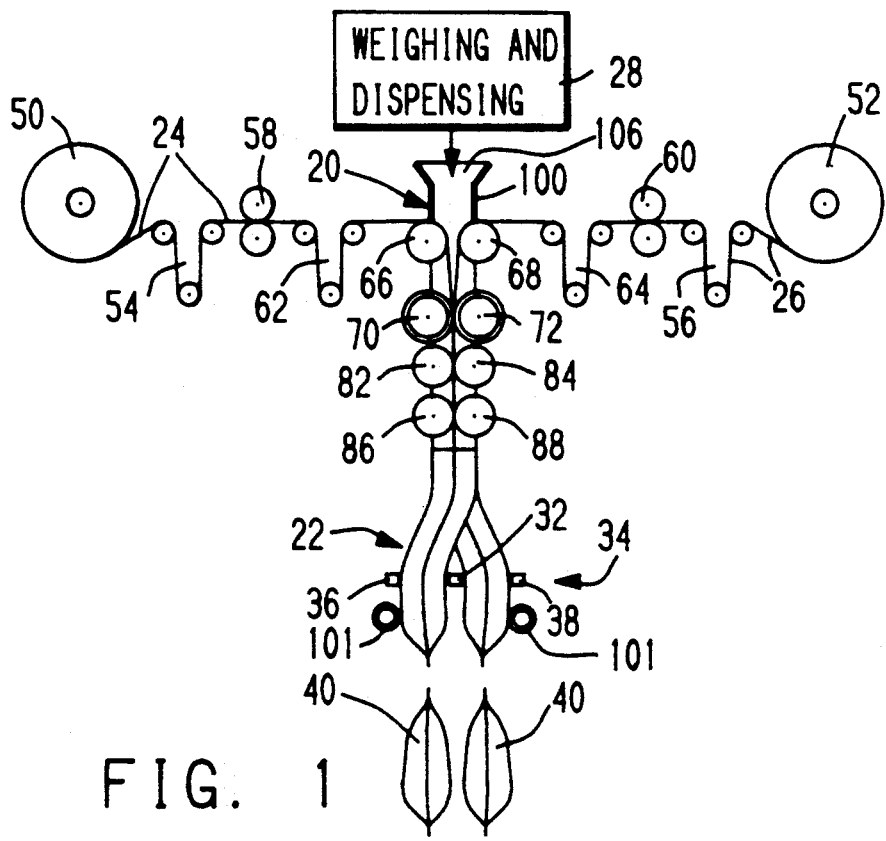
FIG. 1 is a diagrammatical side elevational sectional view of a multi-column bag forming and filling machine in accordance with the invention.

In accordance with one embodiment of the invention illustrated in FIG. 1, a bag forming and filling apparatus includes a plurality of vertical filling and forming tubes indicated generally at 20 about which tubular bag preforms indicated generally at 22 are formed from thermoplastic sheet material. Adjacent preforms 22 are directed to opposite sides of a center sealing bar 32 in a sealing station indicated generally at 34 to enable opposite front and back sealing bars 36 and 38 to form seals on the top of a previously filled preform and on the bottom of the next to be filled preform. The bars 32, 34 and 36 include conventional cutters (not shown) to sever each newly top sealed bag 40 from the sealed bottom of the next preform. Alternatively the bags may be severed at a separate station below the sealing station, or the bags may be only partially severed from each other to facilitate handling and packing of the bags.

Figure 9:
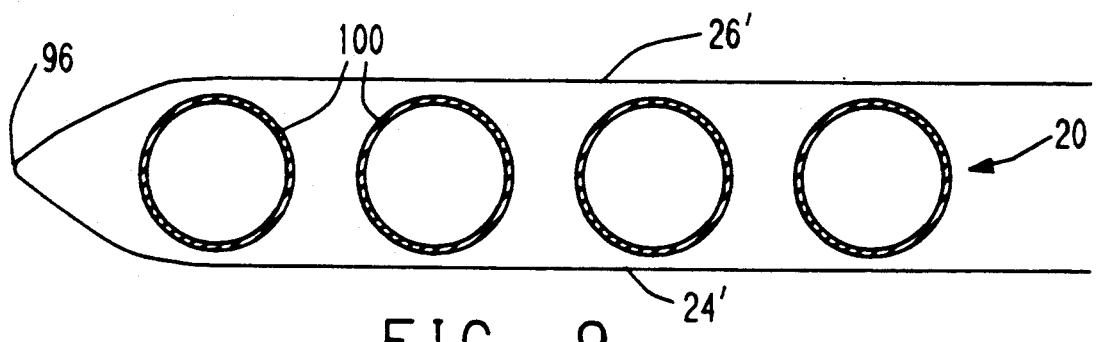
FIG. 9 is a horizontal section view of the apparatus of FIG. 8 taken at line 9—9.
Figure 10:
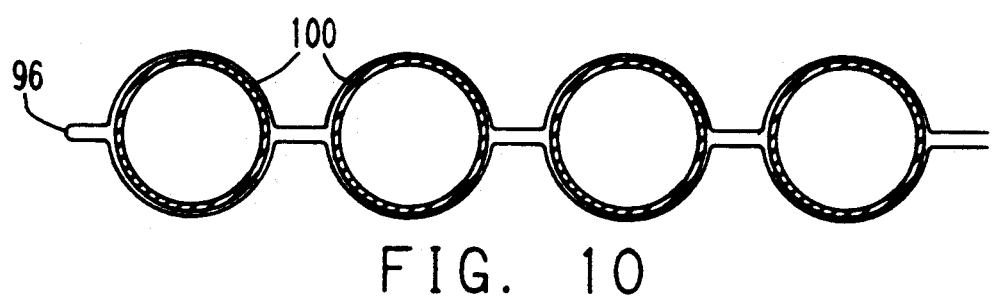
FIG. 10 is a view similar to FIG. 9 but taken at a lower position just above the vertical seam sealing station.

In the embodiment of FIG. 1, the thermoplastic sheet material from which the bags are formed includes continuous sheets of material 24 and 26. In the variation shown of FIGS. 8-10, thermoplastic sheet material includes halves 24' and 26' of a single sheet 27 of thermoplastic material. The sheets are conventional thermoplastic sheet materials (optionally including an adhesive coating) such as cellophane, coated aluminum foil, polyethylene, polypropylene, laminates thereof, and the like used to form heat sealable bags for food snack products.

Figure 2:
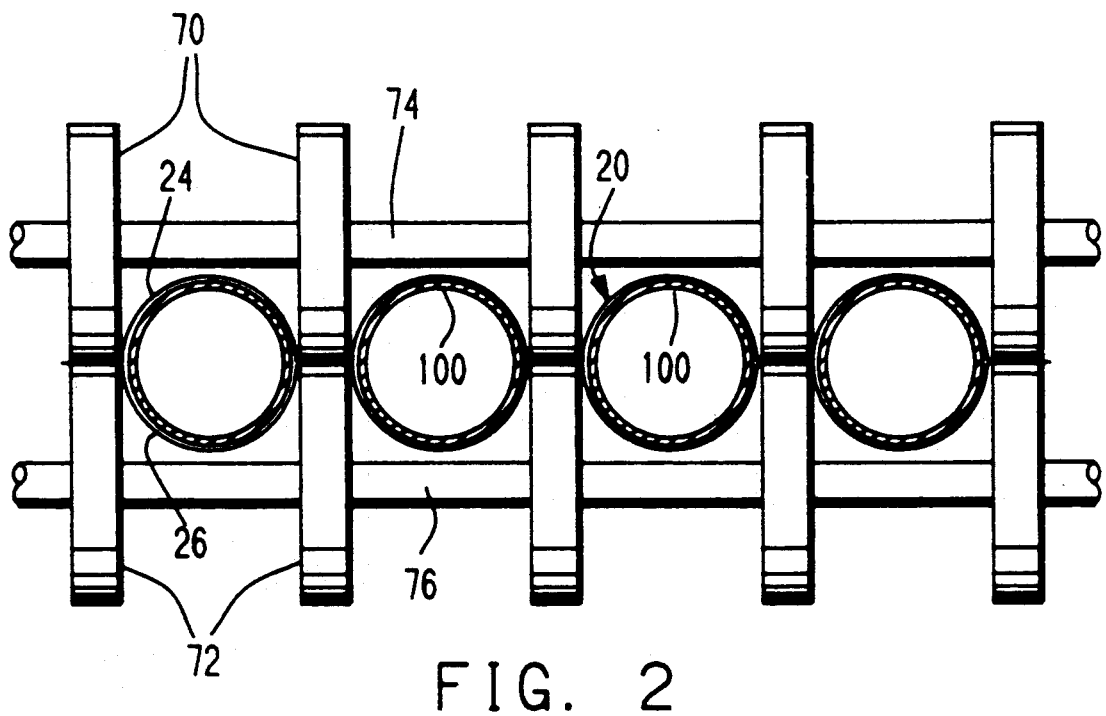
FIG. 2 is a horizontal sectional view of a broken-away portion of the machine of FIG. 1.

In FIG. 1, rolls 50 and 52 of the material 24 and 26 with pre-printed labels and product information are unwound and passed through dancer roller arrangements 54 and 56 by pull rollers 58 and 60. From the pull rollers 58 and 60, the sheets 24 and 26 are directed through dancer roller arrangements 62 and 64 to guide rollers 66 and 68 which form the sheets in a conventional manner around the forming and filling tube arrangement 20. The sheets are sealed together by heat sealing rollers 70 and 72 to form the vertical side seals of the bag preforms. As shown in FIG. 2, the heat sealing rollers 70 and 72 are mounted on respective common shafts 74 and 76 and form a plurality of vertical tubular preforms 22, for example four tubular preforms, from the sheets 24 and 26. Alternatively, heat seal bars such as slide bar seal heaters (not shown) can be used in place of the heat seal rollers 70 and 72. These vertical seals are optionally cooled by chill rollers 82 and 84, and are slit between adjacent columns or vertical tubes by pulling and cutting rollers 86 and 88. While this version of the invention is illustrated as an apparatus which operates in an indexed manner, the invention also is applicable to continuous operation.

Figure 8:
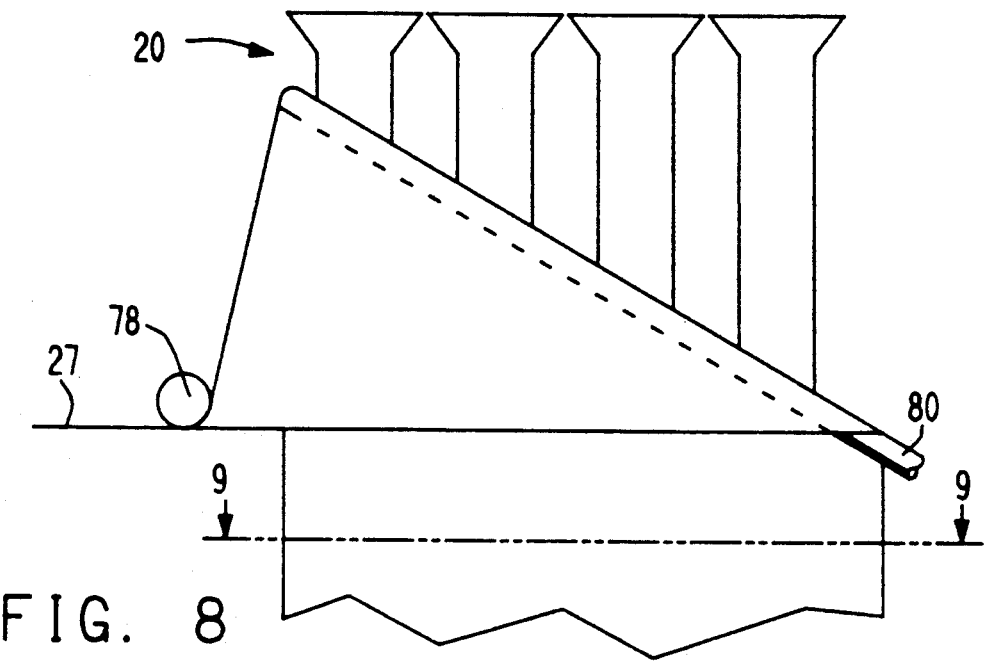
FIG. 8 is an elevational diagrammatic view of modified multi-column bag forming and filling machine in accordance with the invention utilizing a folded single sheet of thermoplastic.

In FIG. 8, the pre-printed sheet 27 is directed from roller 78 over conventional folding mechanism 80 to form the longitudinally folded halves 24' and 26' which are then sealed to form vertical side seals and tubular bag preforms in the same manner as for the two sheets 24 and 26 of FIG. 1. The halves 24' and 26' are sealed together at the fold line 96 to form a vertical sealed edge with substantially the same appearance as the other vertical seals. The use of a single sheet which is folded has the advantage over the two sheet embodiment of FIG. 1 in that the single sheet only requires one conventional registration mechanism (not shown) to maintain the proper positioning of the printing on the front and back of the bags whereas in the two sheet version both sheets require separate registration when both sheets contain printing.

The multiple filling and forming tube arrangement of FIGS. 1-10 includes a plurality of vertical tubes 100 with hoppers 106 for receiving and directing weighed batches of the bulky particulate product from the weighing and dispensing mechanism 28 into the preforms 22. Springs 101 extend horizontally in engagement with the preforms 22 and are vibrated in a conventional manner to shake the preforms during the filling operation so as to settle the product toward the bottom of the preforms to enable the tops of the preforms to be sealed.

The tubes 100 have circular cross sections. However these tubes could have irregular polygon cross sections such as illustrated by the hexagon 142 in FIG. 5, an elliptical cross section as illustrated by the ellipse 144 in FIG. 6, or any other combination of straight and/or curved sides such as the two arcuate sided cross section 146 in FIG. 7. The width of the tube cross section as shown by the dimension 150 in FIG. 5 must generally be at least one-third and preferably at least one-half of the length 152 of the cross section in order to fill the bags which have an internal cross-sectional length slightly larger than the dimension 152. Thus the cross-section width 150 of the tubes must be at least about one-third, and preferably at least about one-half, the width of the bag between the vertical seals 90 and 92 at the filling tube. This enables the bagging apparatus to fill the bags with the fragile low density product. The prior art multi-column bagging machines generally required that the forming and/or filling tubes have a cross-sectional width perpendicular to the thermoplastic sheets less than the width of the bags being filled at the filling tubes.

Referring to FIG. 4, the tubular bag preform 22 has side seams 90 and 92 formed by the heat sealing rollers 70 and 72 of FIGS. 1 and 2, and has a bottom seal 94 formed by the sealing bars at the sealing station 34. A top seal 96, formed on the preform after filling and advancing, completes the sealed bag 40.

In forming and filling a plurality of columns of bags with bulky large particulate material, the width 130 of the preform 22 around the lower end of the filling tube is substantially less than the width 132 of the bottom and top seals 94 and 96. As illustrated in FIGS. 2 and 3, the upper tubular preform portions of horizontally adjacent preforms are closely spaced due to their being formed by sealing two sheets together. Thus the juxtaposed sides of adjacent preforms will overlap when the wider seals 94 and 96 are formed.

In order to permit the seals 94 and 96 to be formed without sealing horizontally adjacent bags together, alternate tubular bag preforms are directed to opposite sides of the center sealing bar 32. Sealing is performed by the moving mechanisms 140 and 142 moving the front and back sealing bars 36 and 38 into engagement with the center sealing bar 32 to form the bottom seal 94 and top seal 96. This avoids the joining of horizontally adjacent bags 40 together.

Additionally the bags 40 are severed from the preforms 22 by conventional cutting edges (not shown) on the bars 32, 36 and 38. For example, conventional cutting edges are illustrated in U.S. Pat. Nos. 1,937,501 and 1,944,147. Alternatively, the bags 40 can be severed from the preforms 22 at a separate severing station (not shown) in a manner similar to that illustrated in U.S. Pat. No. 4,067,173.

The dancers, the guide rollers, the chill rollers, the pull rollers and the like illustrated in FIG. 1 are variable and optional and can be deleted, replaced or supplemented by many other devices.

In a modified filling and bag shaking mechanism shown in FIGS. 11 and 12, each of the filling and forming tube arrangements 20 includes inner and outer coaxial tubes 102 and 104. The hopper 106, FIG. 1, is connected to the inner tube 102 for directing the product, falling under the force of gravity, from the weighing and dispensing mechanism into the inner tube 102 which directs the falling product into the bottom of each tubular bag preform 22. Particulate product, illustrated generally at 108 in FIG. 11, is often loosely packed or unsettled after falling into the preform 22. This is particularly the case with product having a large particle size and relatively light weight, such as tortilla chips, potato chips, corn chips, and the like.

In order to settle or more compactly pack the product into the bottom of the tubular bag preform, there is included the oscillating mechanism, for example, air cylinders (not shown) or an eccentric 112 driving a link 114 pivotally connected to the outer tube 104 for oscillating the outer tube up and down. A plurality of link arrangements, each having a pair of vertical links 118 and 120 pivotally connected to each other at their lower ends and having their upper ends pivotally connected to the bottom of the outer tube 104 and the bottom of the inner tube 102, respectively, are spaced around the bottoms of the tubes. For example there are provided four link pairs spaced 90° apart. These link arrangements are such that the links 118 and 120 pivot outward as shown in FIG. 12 to engage the wall of the tubular bag preform 22 when the outer tube is in its uppermost position. Thus the vertical oscillation of the outer tube 104 results in the oscillation of the wall of the tubular bag preform which in turn shakes the bottom of the preform to settle and more closely pack the product 108.

While the illustrated embodiment of FIGS. 11 and 12 moves the outer tube 104 up and down, the oscillating could alternatively be performed by moving the inner tube 102 up and down with the outer tube being stationary.

Since many modifications, variations and changes in detail may be made to the above disclosed embodiments without departing from the scope and spirit of the invention, all matter described above and shown in the accompanying drawings is intended as illustrative of the disclosed embodiments and is not intended to be limiting on the invention which is defined in the following claims.

What is claimed is:

1. A packaging apparatus for forming sealed bags of snack food product, comprising:

means for advancing and forming continuous sheet material into a plurality of vertical tubular preforms disposed substantially in a common vertical plane with vertical heat seals on opposite sides of each preform;

filling tube means for discharging a predetermined quantity of snack food product into each of said plurality of tubular preforms;

means for separating adjacent vertical tubular preforms from each other along said vertical heat seals;

means for forming a transverse heat seal across each of said plurality of tubular preforms at a sealing station to form a top seal on a filled bag which is formed from each preform extending below the sealing station and a bottom seal on a bag to be filled which is formed from each preform extending above the sealing station; and means for positioning adjacent separated preforms free of transverse top seals outside the common vertical plane at the sealing station so that said adjacent preforms are alternately disposed on opposite sides of the common plane, and thereafter allowing transverse sealing of the preforms on both of said opposite sides without interference between adjacent preforms.

2. An apparatus as claimed in claim 1 wherein said positioning means is for displacing alternate separated tubular preforms in opposite directions perpendicular to the common vertical plane below the fill tubes.

3. An apparatus as claimed in claim 2 wherein the positioning means comprises a horizontal bar spaced below the fill tubes for directing the alternate separated tubular preforms on opposite sides of the horizontal bar.

4. An apparatus as claimed in claim 3 including a fixed center seal bar extending in the common vertical plane such that the alternate separated tubular preforms pass on opposite sides of the center seal bar; and the transverse heat seal forming means comprises a pair of side seal bars on the opposite sides of the center seal bar, and means for moving the side seal bars toward engagement with the center seal bar to form the top and bottom seals on the bags.

5. An apparatus as claimed in claim 1 including means for oscillating vertically the filling tube means, and means responsive to the vertical oscillation for transversely oscillating a wall of the tubular perform by contacting the interior of the preforms wall.

6. An apparatus as claimed in claim 5 wherein the filling tube means comprises inner and outer coaxial tubes, and the oscillation means vertically oscillates one of the outer and inner tubes in a vertical direction relative to the other tube, and the means for transversely oscillating the tubular preform comprises a pair of vertically extending links pivotally joined at their bottom ends and mounted at their upper ends on the inner tube and the outer tube, respectively so that relative movement of the inner and outer tubes causes the links to contact said interior of the preform wall.

7. An apparatus as claimed in claim 6 wherein the means for transversely oscillating the tubular preform comprises a plurality of pairs of vertically extending links spaced circumferentially around the filling tube wherein each pair of links are pivotally joined at their bottom ends and are pivotally mounted at their upper ends on the inner tube and the outer tube, respectively.

8. An apparatus for forming and filling sealed thermoplastic bags of fragile snack food product, comprising:
a plurality of spaced parallel fill tubes having axes extending in a common vertical plane;
means for advancing a pair of continuous thermoplastic sheets or halves of a folded continuous thermoplastic sheet on opposite sides of the plurality of parallel fill tubes in a downward direction;
means for sealing the pair of thermoplastic sheets or sheet halves together on opposite sides of each fill tube with continuous vertical seals to form a plurality of connected vertical tubular preforms;
means for severing adjacent vertical tubular preforms along a vertical line to separate the tubular preforms from each other;
means for displacing alternate separated tubular preforms free of transverse top seals in opposite directions away from the common vertical plane below the fill tubes;
means for forming transverse heat seals across the displaced tubular preforms at a sealing station to form on each tubular preform a top seal on a bag extending below the sealing station and a bottom seal on a bag to be filled extending above the sealing station; and
means for discharging predetermined quantities of particulate material into the filling tubes to pass downward under the force of gravity into the bags to be filled.

9. An apparatus as claimed in claim 8 wherein the displacing means comprises a horizontal bar spaced below the fill tubes for directing the alternate separated tubular preforms on opposite sides of the horizontal bar.

10. An apparatus as claimed in claim 9 including a fixed center seal bar extending in the common vertical plane so that the alternate separated tubular performs pass on opposite sides of the center seal bar; and the transverse heat seal forming means comprises a pair of side seal bars on the opposite sides of the center seal bar, and means for moving the side seal bars toward engagement with the center seal bar to form the top and bottom seals on the bags.

11. A method of forming and filling sealed thermoplastic bags of fragile snack food product, comprising the steps of:
advancing a pair of continuous thermoplastic sheets or halves of a folded continuous thermoplastic sheet downward on opposite sides of a plurality of parallel fill tubes which have axes extending in a common vertical plane;
sealing the pair of thermoplastic sheets or halves of folded thermoplastic sheet together on opposite sides of each fill tube with continuous vertical seals to form a plurality of connected vertical tubular preforms;
severing adjacent vertical tubular preforms along a vertical line to separate the tubular preforms from each other;
discharging predetermined quantities of food product into the filling tubes to pass the food product downward under the force of gravity into the bags to be filled;
displacing alternate separated tubular preforms in opposite directions away from the common vertical plane below the fill tubes; and
thereafter forming transverse heat seals across the displaced tubular preforms at a sealing station to form on each tubular preforms a top seal on a filled bag extending below the sealing station and a bottom seal on a bag to be filled extending above the sealing station.

12. A method as claimed in claim 11 wherein the displacing step is performed by passing the alternate separate tubular preforms on opposite sides of a horizontal spacing bar below the plurality of parallel fill tubes.

13. A method as claimed in claim 12 wherein the step of forming transverse heat seals is performed by moving side sealing bars on the opposite sides of the horizontal spacing bar toward the spacing bar to form the transverse seals.

14. An apparatus for forming and filling sealed thermoplastic bags of fragile snack food product, comprising:
means for advancing and forming front and back thermoplastic sheets into a plurality of parallel connected vertical tubular preforms in a common vertical plane with vertical seals on opposite sides of each tubular preform;

means for severing adjacent vertical tubular preforms along a vertical line to separate the tubular preforms from each other;

means for displacing alternate separated tubular preforms free of transverse top seals in opposite directions away from the common vertical plane;

means for forming transverse heat seals across each displaced tubular preform at a sealing station to form a top seal on a bag formed from each tubular preform extending below the sealing station and a bottom seal on a bag to be filled formed from each tubular preform extending above the sealing station;

means for discharging a predetermined quantity of fragile food product into a filling tube extending into each tubular preform to fill the bag extending above the sealing station; and oscillating means for contacting an interior of a wall of the tubular preform when the preform is above the sealing station for oscillating the preform to settle the fragile food product into the bag extending above the sealing station.

15. An apparatus as in claim 14, wherein the oscillating means comprises coaxial inner and outer tubes which form the filling tube and are connected by pivot links, and movement of the inner and outer tubes relative to each other causes the pivot links to engage the interior of the preform wall in an oscillatory manner to settle the food product.

* * * * *